(12) United States Patent
Mori et al.

(10) Patent No.: US 11,117,824 B2
(45) Date of Patent: Sep. 14, 2021

(54) METHOD AND DEVICE FOR PRODUCING BAND-SHAPED GLASS FILM

(71) Applicant: Nippon Electric Glass Co., Ltd., Shiga (JP)

(72) Inventors: Koichi Mori, Shiga (JP); Koji Nishijima, Shiga (JP); Hiroki Mori, Shiga (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 315 days.

(21) Appl. No.: 16/325,766

(22) PCT Filed: Sep. 28, 2017

(86) PCT No.: PCT/JP2017/035186
§ 371 (c)(1),
(2) Date: Feb. 15, 2019

(87) PCT Pub. No.: WO2018/070258
PCT Pub. Date: Apr. 19, 2018

(65) Prior Publication Data
US 2019/0177202 A1 Jun. 13, 2019

(30) Foreign Application Priority Data

Oct. 11, 2016 (JP) .............................. JP2016-200031

(51) Int. Cl.
*C03B 33/02* (2006.01)
*C03B 17/06* (2006.01)
(Continued)

(52) U.S. Cl.
CPC .......... *C03B 33/0215* (2013.01); *B28D 1/226* (2013.01); *B65G 49/063* (2013.01);
(Continued)

(58) Field of Classification Search
None
See application file for complete search history.

(56) References Cited

U.S. PATENT DOCUMENTS

| 2,705,390 A * | 4/1955 | Denlow ............. C03B 33/0215 225/2 |
| 2006/0021385 A1 * | 2/2006 | Cimo ..................... C03C 17/32 65/36 |

(Continued)

FOREIGN PATENT DOCUMENTS

JP        2012-25624         2/2012

OTHER PUBLICATIONS

International Search Report dated Dec. 19, 2017 in International (PCT) Application No. PCT/JP2017/035186.
(Continued)

*Primary Examiner* — Queenie S Dehghan
(74) *Attorney, Agent, or Firm* — Wenderoth, Lind & Ponack, L.L.P.

(57) ABSTRACT

A manufacturing method for a band-shaped glass film (GF) includes use of: a plurality of rollers (10) configured to change a direction of the falling band-shaped glass film (GF) to a horizontal direction; and a first horizontal-conveyance unit (4) configured to convey the band-shaped glass film (GF) in the horizontal direction after the changing of the direction of the band-shaped glass film (GF). After a lower end of the band-shaped glass film (GF) passes through a position between the plurality of rollers (10) being at a retreated position (P2) and the first horizontal-conveyance unit (4), the plurality of rollers (10) are moved from the retreated position (P2) to a regular position (P1) to apply a pressing force to the band-shaped glass film (GF), to thereby cut the band-shaped glass film (GF) along a width direction by bend-breaking.

4 Claims, 5 Drawing Sheets

(51) Int. Cl.
*C03B 33/10* (2006.01)
*C03B 35/16* (2006.01)
*B28D 1/22* (2006.01)
*B65G 49/06* (2006.01)
*C03B 33/023* (2006.01)

(52) U.S. Cl.
CPC .......... *C03B 33/0235* (2013.01); *C03B 33/10* (2013.01); *C03B 33/105* (2013.01); *C03B 35/161* (2013.01); *C03B 17/064* (2013.01)

(56) References Cited

U.S. PATENT DOCUMENTS

2011/0197634 A1\* 8/2011 Eta .......................... C03B 17/06
65/97
2011/0198378 A1\* 8/2011 Chang .................. B65G 49/065
226/7
2012/0024929 A1 2/2012 Teranishi et al.
2013/0126576 A1\* 5/2013 Marshall ................ C03B 33/03
225/2

OTHER PUBLICATIONS

International Preliminary Report on Patentability dated Apr. 16, 2019 in International (PCT) Application No. PCT/JP2017/035186.

\* cited by examiner

METHOD AND DEVICE FOR PRODUCING BAND-SHAPED GLASS FILM

TECHNICAL FIELD

The present invention relates to a manufacturing method and a manufacturing apparatus for a band-shaped glass film.

BACKGROUND ART

As is well known, thinning of glass sheets to be used in flat panel displays (FPD), such as a liquid crystal display, a plasma display, and an OLED display, glass sheets to be used in OLED illumination, glass sheets to be used for producing a tempered glass that is a component of a touch panel, and the like, and glass sheets to be used in panels of solar cells, and the like has been promoted in the current circumstances.

Among such types of glass sheets formed into a thin sheet, a glass film having a small thickness (for example, equal to or smaller than 300 μm) and flexibility is manufactured by, for example, a manufacturing method which is called "overflow down-draw method".

For example, as disclosed in Patent Literature 1, in the manufacturing method using the overflow down-draw method, in some cases, a band-shaped glass film falling from a forming trough is changed in direction and conveyed in a horizontal direction through use of, for example, members including rollers (direction-changing member) configured to change a direction of the falling band-shaped glass film to the horizontal direction and a belt conveyor (horizontal-conveyance unit) configured to convey the band-shaped glass film having been changed in direction in the horizontal direction.

The band-shaped glass film is changed in direction and conveyed in the horizontal direction in such a manner because of the following reasons. Specifically, the band-shaped glass film can easily be conveyed in a stable posture. Moreover, laser cutting can easily be performed on both end portions of the band-shaped glass film in a width direction, which are not required for a finished product.

CITATION LIST

Patent Literature 1: JP 2012-25624 A

SUMMARY OF INVENTION

Technical Problem

Incidentally, for example, at the time of starting manufacture of the band-shaped glass film, it is required that a lower end portion of the band-shaped glass film which starts falling from the forming trough be changed in direction to be introduced to the horizontal-conveyance unit. Moreover, on this occasion, it is preferred that the band-shaped glass film be cut in advance in the width direction thereof for the purpose of, for example, forming the lower end portion of the band-shaped glass film into an appropriate shape.

However, in the related art, a technology as to a suitable position and a suitable method for cutting the falling band-shaped glass film in the width direction has not been established. Therefore, there has been a difficulty in appropriately changing the band-shaped glass film in direction and smoothly introducing the band-shaped glass film to the horizontal-conveyance unit.

The present invention has been made in view of the above-mentioned circumstance, and has a technical object to cut a falling band-shaped glass film in the width direction at an appropriate position and by an appropriate method to thereby appropriately change the band-shaped glass film in direction and smoothly introduce the band-shaped glass film to a horizontal-conveyance unit.

Solution to Problem

According to one embodiment of the present invention, which has been devised to achieve the above-mentioned object, there is provided a manufacturing method for a band-shaped glass film, comprising use of: a direction-changing member configured to change a direction of a falling band-shaped glass film to a horizontal direction; and a horizontal-conveyance unit configured to convey the band-shaped glass film in the horizontal direction after the changing of the direction of the band-shaped glass film, wherein the direction-changing member is movable in the horizontal direction between a regular position for changing the band-shaped glass film in direction and a retreated position which is separated from the horizontal-conveyance unit farther than the regular position, and wherein, after a lower end of the band-shaped glass film passes through a position between the direction-changing member being at the retreated position and the horizontal-conveyance unit, the direction-changing member is moved from the retreated position toward the regular position to apply a pressing force to the band-shaped glass film, to thereby cut the band-shaped glass film along a width direction by bend-breaking.

According to this configuration, the band-shaped glass film on an upper side with respect to the part cut by the bend-breaking is supported by the direction-changing member from a lower side. On this occasion, the band-shaped glass film is guided so as to be appropriately changed in direction. Thus, after the direction-changing member has moved to the regular position, the band-shaped glass film may be smoothly introduced to the horizontal-conveyance unit. That is, by the manufacturing method for a band-shaped glass film according to the one embodiment of the present invention, the falling band-shaped glass film is cut in the width direction along with the movement of the direction-changing member toward the regular position, thereby being capable of appropriately changing the band-shaped glass film in direction and smoothly introducing the band-shaped glass film to the horizontal-conveyance unit.

In the above-mentioned configuration, the band-shaped glass film may be scratched for the bend-breaking.

With this configuration, the bend-breaking of the band-shaped glass film can easily be performed.

In the above-mentioned configuration, the direction-changing member may comprise a plurality of rollers which are assembled to a casing, and the direction-changing member may be movable between the regular position and the retreated position by movement of the casing.

With this configuration, a pressing force for cutting can be applied to the band-shaped glass film by directly bringing the rollers into abutment against the band-shaped glass film. Moreover, the plurality of rollers can be collectively moved with the casing.

In the above-mentioned configuration, a scratching unit configured to scratch the band-shaped glass film for the bend-breaking may be assembled to the casing.

With this configuration, the number of components and a space can be reduced as compared to a case in which the scratching unit is provided at a location different from the casing.

In a case in which the scratching unit configured to scratch the band-shaped glass film for the bend-breaking is assembled to the casing, the scratching unit may scratch the band-shaped glass film while the direction-changing member moves from the retreated position to the regular position.

With this configuration, when the casing approaches the band-shaped glass film, the band-shaped glass film can be scratched by the scratching unit. Thus, the scratching unit can be arranged close to the casing, and hence a member having a large length for mounting the scratching unit to the casing is not required, thereby being capable of reducing the number of components and a space.

In the case in which the scratching unit configured to scratch the band-shaped glass film for the bend-breaking is assembled to the casing, a speed of the direction-changing member given at the time of moving from the retreated position to the regular position may be higher after the scratching unit scratches the band-shaped glass film than before the scratching unit scratches the band-shaped glass film.

With this configuration, when the direction-changing member is brought into contact with the band-shaped glass film before the scratching, damage on the band-shaped glass film can be suppressed. Moreover, the bend-breaking after the scratching can more reliably be performed.

In the case in which the scratching unit configured to scratch the band-shaped glass film for the bend-breaking is assembled to the casing, the scratching unit may scratch both end portions of the band-shaped glass film in the width direction.

With this configuration, both end portions of the band-shaped glass film in the width direction, which are difficult to be cut due to large thickness, can more reliably be cut.

In the above-mentioned configuration, a support member configured to support the band-shaped glass film from a lower side may be provided between the direction-changing member being at the regular position and the horizontal-conveyance unit, and the support member may be movable in an up-and-down direction between a support position for supporting the band-shaped glass film and a waiting position below the support position.

With this configuration, when the band-shaped glass film on upstream of the cut part cannot be fully supported by the direction-changing member, the band-shaped glass film can be received by the support member at the waiting position. Then, when the support member having received the band-shaped glass film moves from the waiting position to the support position, the band-shaped glass film can be advanced to the horizontal-conveyance unit. That is, with this configuration, the band-shaped glass film can more reliably be introduced to the horizontal-conveyance unit.

According to one embodiment of the present invention, which has been devised to achieve the above-mentioned object, there is provided a manufacturing apparatus for a band-shaped glass film, comprising: a direction-changing member configured to change a direction of a falling band-shaped glass film to a horizontal direction; and a horizontal-conveyance unit configured to convey the band-shaped glass film in the horizontal direction after the changing of the direction of the band-shaped glass film, wherein the direction-changing member is movable in the horizontal direction between a regular position for changing the band-shaped glass film in direction and a retreated position which is separated from the horizontal-conveyance unit farther than the regular position, and wherein, after a lower end of the band-shaped glass film passes through a position between the direction-changing member being at the retreated position and the horizontal-conveyance unit, the direction-changing member is moved from the retreated position toward the regular position to apply a pressing force to the band-shaped glass film, to thereby cut the band-shaped glass film along a width direction by bend-breaking.

With this configuration, an action and an effect which are substantially the same as the action and the effect attained with the manufacturing method for a band-shaped glass film according to the present invention described in the beginning of Description can be attained.

Advantageous Effects of Invention

As described above, according to the present invention, the falling band-shaped glass film is cut in the width direction at an appropriate position and by an appropriate method, thereby being capable of appropriately changing the band-shaped glass film in direction and smoothly introducing the band-shaped glass film to the horizontal-conveyance unit.

DESCRIPTION OF EMBODIMENTS

Now, with reference to the drawings, description is made of an embodiment of the present invention.

Figure 1:
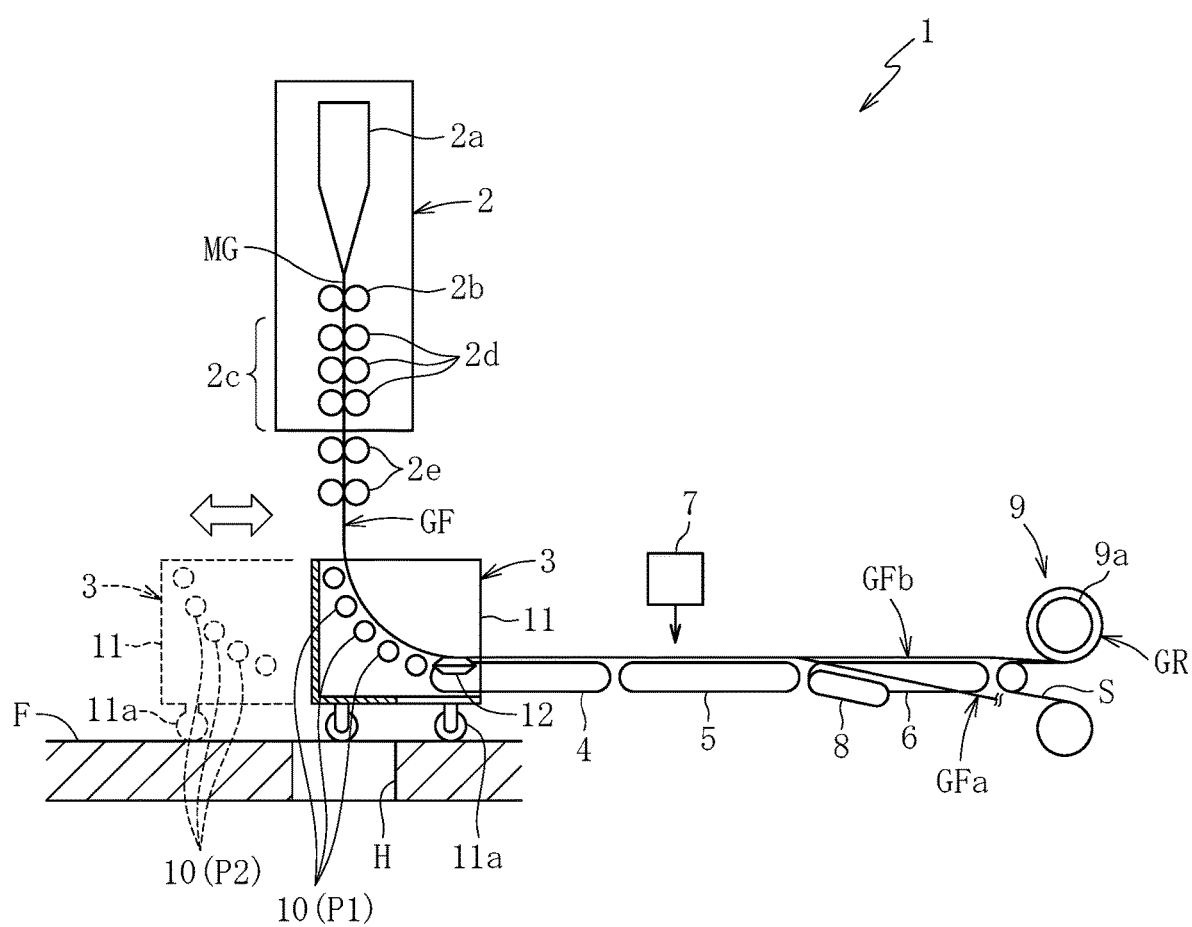
FIG. 1 is a schematic side view for illustrating a normal operation state of a manufacturing apparatus for a band-shaped glass film according to an embodiment of the present invention.

FIG. 1 is a schematic side view for illustrating a normal operation state of a manufacturing apparatus for a band-shaped glass film according to the embodiment of the present invention. A manufacturing apparatus 1 for a band-shaped glass film is configured to manufacture a band-shaped glass film GF (GFb) by an overflow down-draw method.

The manufacturing apparatus 1 mainly comprises a forming unit 2, a direction-changing unit 3, a first horizontal-conveyance unit 4, a second horizontal-conveyance unit 5, a third horizontal-conveyance unit 6, a cutting unit 7, an auxiliary conveyance unit 8, and a winding unit 9.

The forming unit 2 is configured to form the band-shaped glass film GF while allowing a molten glass MG to flow down in a vertical direction from a forming trough 2a by the overflow down-draw method.

In the forming unit 2, the band-shaped molten glass MG is continuously produced from the forming trough 2a. Then, through use of cooling rollers 2b configured to regulate contraction of the band-shaped molten glass MG in a width direction and annealer rollers 2d arranged in a plurality of stages in an annealer 2c configured to eliminate distortion, the band-shaped molten glass MG is drawn downward while being sandwiched from both front and backsides, thereby forming the band-shaped glass film GF. Moreover, support rollers 2e configured to draw the band-shaped glass film GF downward while sandwiching the band-shaped glass film GF from both the front and back sides are arranged directly below the annealer rollers 2d. Through use of the support rollers 2e, the band-shaped glass film GF in the annealer 2c is tensioned.

In this embodiment, the band-shaped glass film GF is formed by the overflow down-draw method. However, the method is not limited to the overflow down-draw method. The band-shaped glass film GF may be formed by, for example, a slot down-draw method or a re-draw method.

The direction-changing unit 3 is configured to change a direction of the band-shaped glass film GF, which has been formed in the forming unit 2 and falls, to a horizontal direction while causing the band-shaped glass film GF to curve in a longitudinal direction. The direction-changing unit 3 comprises a plurality of rollers 10 (direction-changing member) and a casing 11. The plurality of rollers 10 are configured to rotate while supporting the curved band-shaped glass film GF from a lower side. The casing 11 receives the plurality of rollers 10 assembled thereto. The plurality of rollers 10 are arranged in parallel with each other so as to form a conveyance path smoothly curved in a recessed shape. The casing 11 comprises wheels 11a arranged at its lower portion. The direction-changing unit 3 is movable in the horizontal direction on a floor F with the wheels 11a. Through movement of the direction-changing unit 3 in the horizontal direction, the plurality of rollers 10 are movable in the horizontal direction between a regular position P1 for changing the band-shaped glass film GF in direction and a retreated position P2. The retreated position P2 of the plurality of rollers 10 is a position separated from the first horizontal-conveyance unit 4 farther than the regular position P1.

Figure 4A:
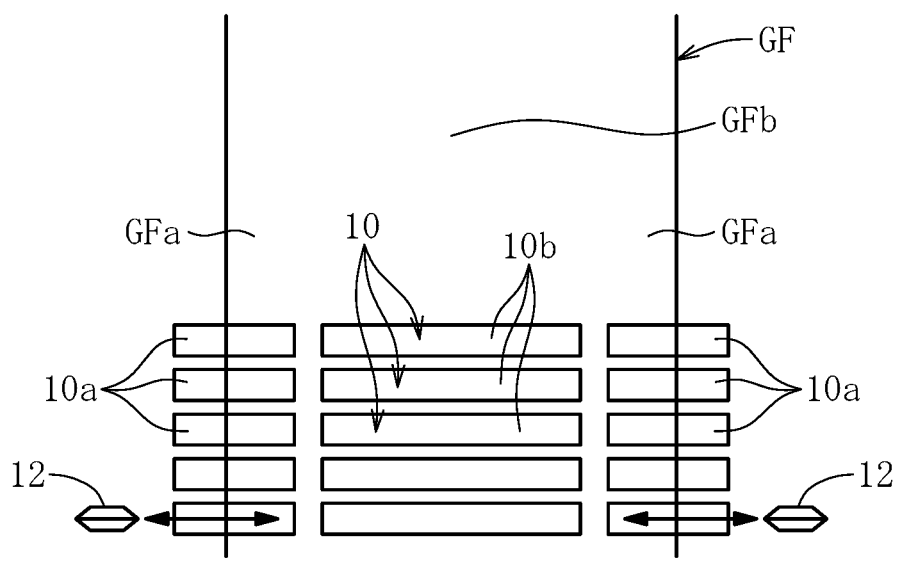
FIG. 4A is a schematic view for illustrating an operation of scratching units at the time of starting manufacture of the band-shaped glass film as seen from the right side in FIG. 3.

The plurality of rollers 10 of the direction-changing unit 3 each have a rotation axis extending along the width direction of the band-shaped glass film GF (see FIG. 4A). The rollers 10 each comprise a pair of end support portions 10a and a center support portion 10b. The pair of end support portions 10a are configured to support both end portions (edge portions GFa) of the band-shaped glass film GF in the width direction. The center support portion 10b is configured to support a center portion (effective surface portion GFb to be used as a finished product) of the band-shaped glass film GF in the width direction. The center support portion 10b is configured to be reciprocable between a support position and a retreated position. At the support position, the center support portion 10b is capable of supporting the effective surface portion GFb. At the retreated position, the center support portion 10b does not support the effective surface portion GFb. The center support portion 10b is held at the support position at the time of starting manufacture of the band-shaped glass film GF by the forming unit 2, thereby contributing to stabilization of forming accuracy for the band-shaped glass film GF. After the forming accuracy for the band-shaped glass film GF is stabilized, the center support portion 10b is brought to the retreated position, thereby preventing unnecessary damage on the effective surface portion GFb.

In this embodiment, all of the plurality of rollers 10 (roller conveyor) of the direction-changing unit 3 are drive rollers. However, some or all of the plurality of rollers 10 may be non-drive rollers (guide rollers). Moreover, it is not always required that the direction-changing member of the direction-changing unit 3 be the plurality of rollers 10. The direction-changing member may be, for example, a belt conveyor or an air-float table.

Figure 4B:
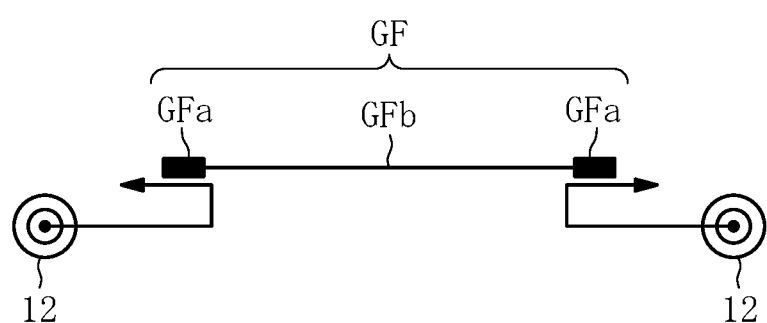
FIG. 4B is a schematic top view for illustrating an operation of the scratching units at the time of starting manufacture of the band-shaped glass film.

A pair of scratching units 12 are assembled to the casing 11 of the direction-changing unit 3 (see FIG. 4A and FIG. 4B). The scratching units 12 are configured to scratch the band-shaped glass film GF at the time of starting manufacture of the band-shaped glass film GF. At the time other than the time of scratching, the scratching units 12 wait at positions separated from the band-shaped glass film GF in the width direction of the band-shaped glass film GF.

In this embodiment, the scratching units 12 are each a wheel cutter using a diamond chip. However, the scratching units 12 each are not limited to the wheel cutter. The scratching units 12 may each be, for example, a cemented carbide blade, a file, or sand paper, or may each be a device such as a laser emitter for scratching with laser light.

As illustrated in FIG. 1, the first horizontal-conveyance unit 4 is configured to convey the band-shaped glass film GF, which has a direction changed to the horizontal direction by the direction-changing unit 3, while supporting the band-shaped glass film GF from a lower side.

The second horizontal-conveyance unit 5 is configured to convey the band-shaped glass film GF, which has been conveyed from the first horizontal-conveyance unit 4, in the horizontal direction while supporting the band-shaped glass film GF from the lower side. The cutting unit 7 is formed of, for example, a laser cutting device, and is configured to cut the both end portions (edge portions GFa) of the band-shaped glass film GF, which is supported by the second horizontal-conveyance unit 5, in the width direction along an advancing direction of the band-shaped glass film GF.

The third horizontal-conveyance unit 6 is configured to convey the band-shaped glass film GF having the edge portions GFa cut therefrom (effective surface portion GFb to be used as a finished product) while supporting the band-shaped glass film GF from the lower side. The auxiliary conveyance unit 8 is configured to convey the edge portions GFa, which have been cut, obliquely downward while supporting the edge portions GFa from the lower side.

The first to third horizontal-conveyance units 4 to 6 and the auxiliary conveyance unit 8 are each a belt conveyor in this embodiment, but may each be, for example, a roller conveyor. As long as the band-shaped glass films GF, GFa, and GFb can be conveyed by a driving force applied by any one of the members included in the entirety of the manufacturing apparatus 1, it is not always required that the first to third horizontal-conveyance units 4 to 6 and the auxiliary conveyance unit 8 apply the driving force for conveyance to the band-shaped glass films GF, GFa, and GFb. The first to third horizontal-conveyance units 4 to 6 and the auxiliary conveyance unit 8 may each be a roller conveyor formed of only non-drive rollers (guide rollers), or may each be, for example, an air-float table.

The winding unit 9 is configured to superpose the effective surface portion GFb of the band-shaped glass film GF, which has been conveyed from the third horizontal-conveyance unit 6, on a protection sheet S and wind up the band-shaped glass film GF into a roll around a winding core 9a to form a glass roll GR.

In this embodiment, the band-shaped glass film GF is conveyed in the direction orthogonal to the gravity direction, as the horizontal direction. However, the horizontal direction is not limited to such direction. The band-shaped glass film GF may be conveyed in a direction inclined upward or downward within a range of 45° or less with respect to the direction orthogonal to the gravity direction.

Next, description is made of the time of starting manufacture of the band-shaped glass film GF by the manufacturing apparatus 1.

Figure 2:
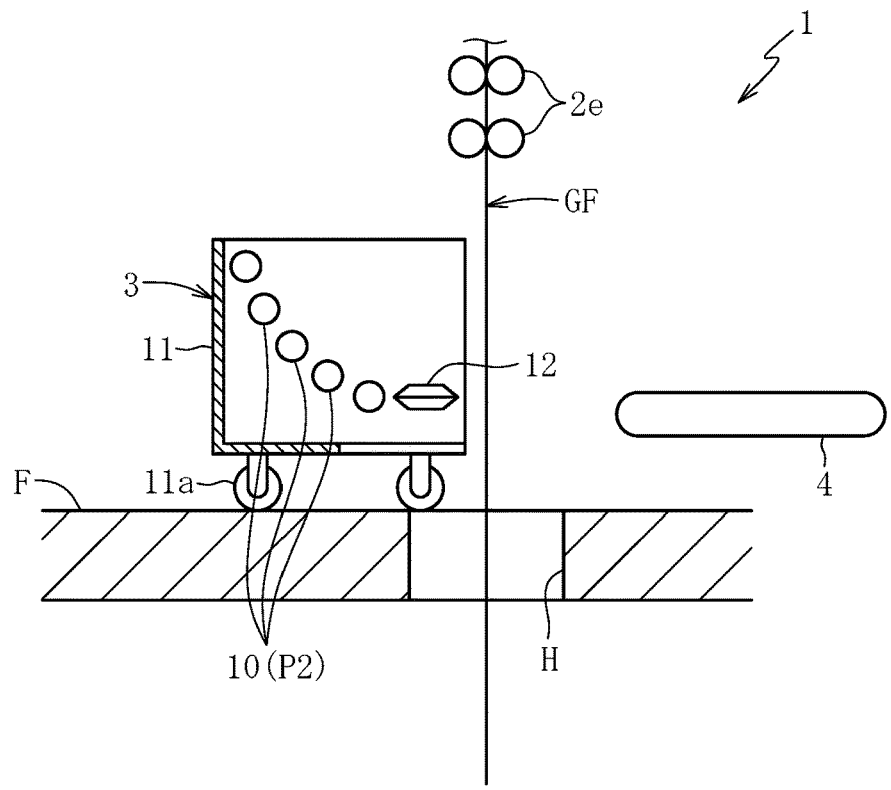
FIG. 2 is a schematic side view for illustrating an operation of the manufacturing apparatus at the time of starting manufacture of the band-shaped glass film.

As illustrated in FIG. 2, the direction-changing unit 3 is moved in advance so that the rollers 10 are held at the retreated position P2. On this occasion, the center support portions 10b of the rollers 10 of the direction-changing unit 3 are held at the support position. Then, forming of the band-shaped glass film GF with the forming unit 2 is started. Then, until the shape of the band-shaped glass film GF is stabilized, the band-shaped glass film GF is caused to continuously fall from the forming trough 2a. With this, the lower end of the band-shaped glass film GF passes through a position between the rollers 10 being at the retreated position P2 and the first horizontal-conveyance unit 4, and thereafter further passes through a through hole H formed in the floor F, thereby reaching a lower-level floor.

Figure 3:
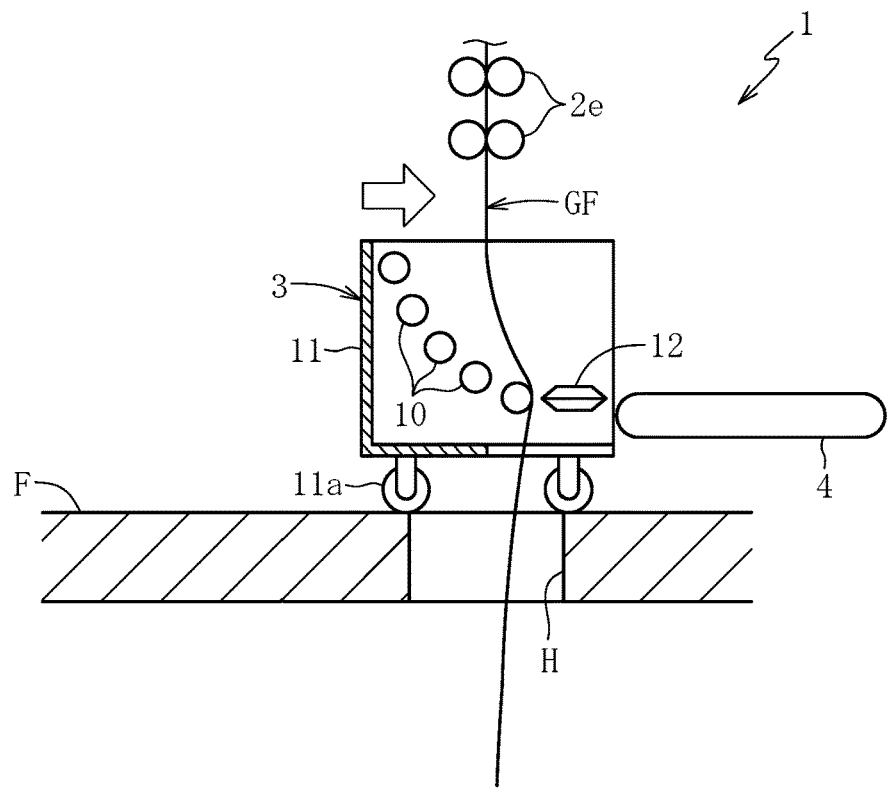
FIG. 3 is a schematic side view for illustrating an operation of the manufacturing apparatus at the time of starting manufacture of the band-shaped glass film.

Next, as illustrated in FIG. 3, the direction-changing unit 3 is moved to the first horizontal-conveyance unit 4 side. Along with this movement, the rollers 10 move from the retreated position P2 to the regular position P1. Then, on this occasion, a surface of the band-shaped glass film GF on the first horizontal-conveyance unit 4 side is scratched by the scratching units 12. At the time of scratching, as indicated by the arrows in FIG. 4B, one of the pair of scratching units 12 scratches one of the edge portions GFa (both end portions in the width direction) of the band-shaped glass film GF, and another of the pair of scratching units 12 scratches another of the edge portions GFa (both end portions in the width direction) of the band-shaped glass film GF. Specifically, the scratching units 12 move from the outer sides to the inner side along the width direction of the band-shaped glass film GF in a non-contact state, and thereafter scratch the edge portions GFa of the band-shaped glass film GF from the inner side to the outer sides along the width direction of the band-shaped glass film GF.

In the illustrated example, at the time of scratching, the scratching units 12 are arranged opposed to the roller 10 in the lowermost stage (most downstream) of the direction-changing unit 3, and the roller 10 in the lowermost stage supports the band-shaped glass film GF. However, the arrangement is not limited to this arrangement. As long as a certain supporting force can be given by the roller 10 in the lowermost stage, the scratching units 12 may be arranged above or below the position opposed to the roller 10 in the lowermost stage.

Figure 5:
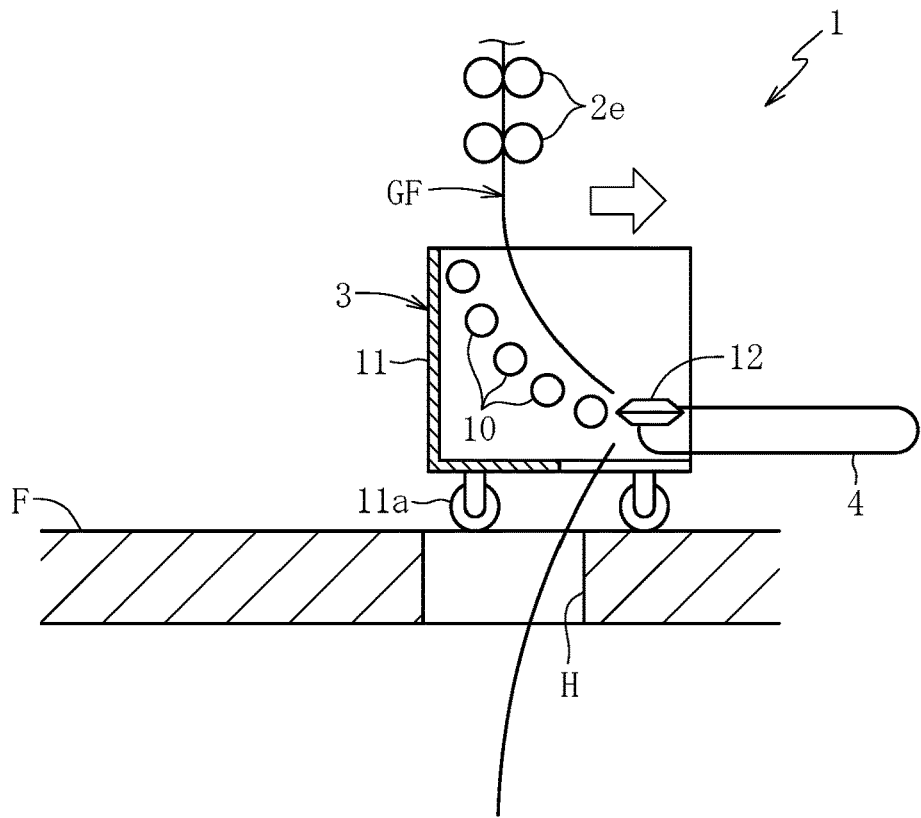
FIG. 5 is a schematic side view for illustrating an operation of the manufacturing apparatus at the time of starting manufacture of the band-shaped glass film.

As the direction-changing unit 3 is continuously moved toward the first horizontal-conveyance unit 4 side, as illustrated in FIG. 5, the roller 10 in the lowermost stage of the direction-changing unit 3 is brought into abutment against the band-shaped glass film GF to apply the pressing force to the band-shaped glass film GF. With this, the band-shaped glass film GF is cut along the width direction by bend-breaking. The roller 10 in the lowermost stage of the direction-changing unit 3 is located on the most distal end side in the moving (advancing) direction of the direction-changing unit 3 among the rollers 10 of the direction-changing unit 3.

Further, as the direction-changing unit 3 is moved toward the first horizontal-conveyance unit 4 side, under a state in which a part of the band-shaped glass film GF on upstream of the cut part is held by the plurality of rollers 10, the rollers 10 reach the regular position P1. A speed of the rollers 10 of the direction-changing unit 3 given at the time of moving from the retreated position P2 to the regular position P1 is higher after the scratching units 12 scratch the band-shaped glass film GF than before the scratching units 12 scratch the band-shaped glass film GF.

Figure 6:
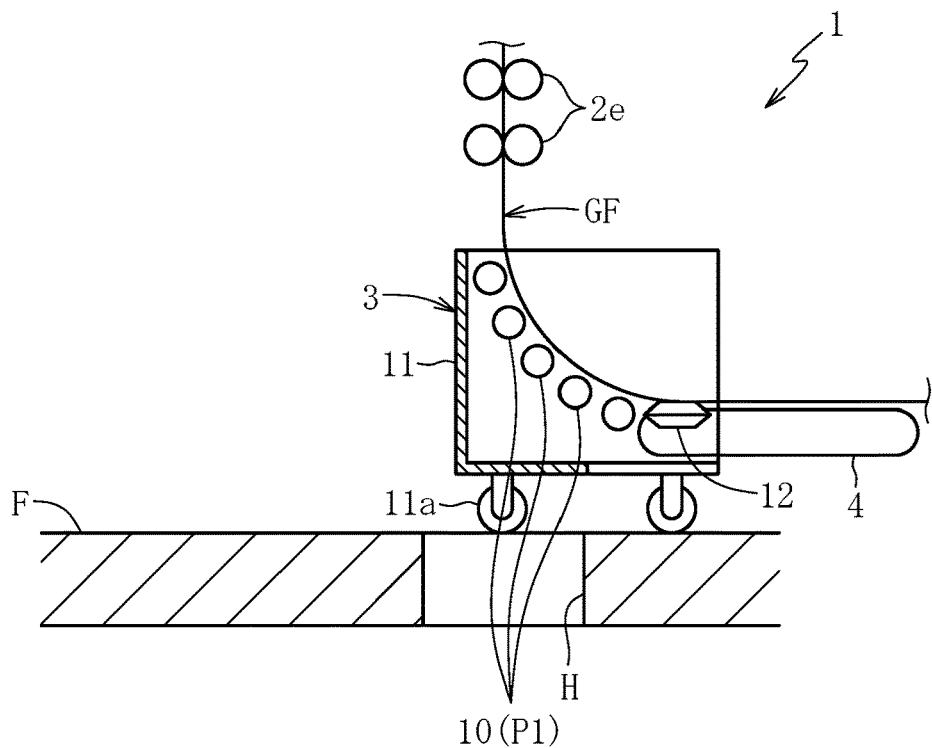
FIG. 6 is a schematic side view for illustrating an operation of the manufacturing apparatus at the time of starting manufacture of the band-shaped glass film.

After that, as illustrated in FIG. 6, the part of the band-shaped glass film GF on upstream of the cut part advances onto the first horizontal-conveyance unit 4 by the own weight or drive of, for example, the support rollers 2e. Then, the part of the band-shaped glass film GF on upstream of the cut part advances from the first horizontal-conveyance unit 4 onto the second horizontal-conveyance unit 5, and the normal operation of the manufacturing apparatus 1 described with reference to FIG. 1 is started. On this occasion, the center support portions 10b of the rollers 10 of the direction-changing unit 3 are brought to the retreated position.

With the manufacturing apparatus 1 having the configuration described above, the following effect can be attained.

The part of the band-shaped glass film GF on the upper side with respect to the cut part by the bend-breaking is supported from the lower side by the plurality of rollers 10. On this occasion, the band-shaped glass film GF is guided so as to be appropriately changed in direction. Thus, after the plurality of rollers 10 are moved to the regular position P1, the band-shaped glass film GF can smoothly advance onto the first horizontal-conveyance unit 4. That is, with the manufacturing method for a band-shaped glass film according to this embodiment, the falling band-shaped glass film GF is cut in the width direction along with the movement of the plurality of rollers 10 toward the regular position P1 side. Accordingly, the band-shaped glass film GF can be appropriately changed in direction and smoothly introduced to the first horizontal-conveyance unit 4.

Figure 7:
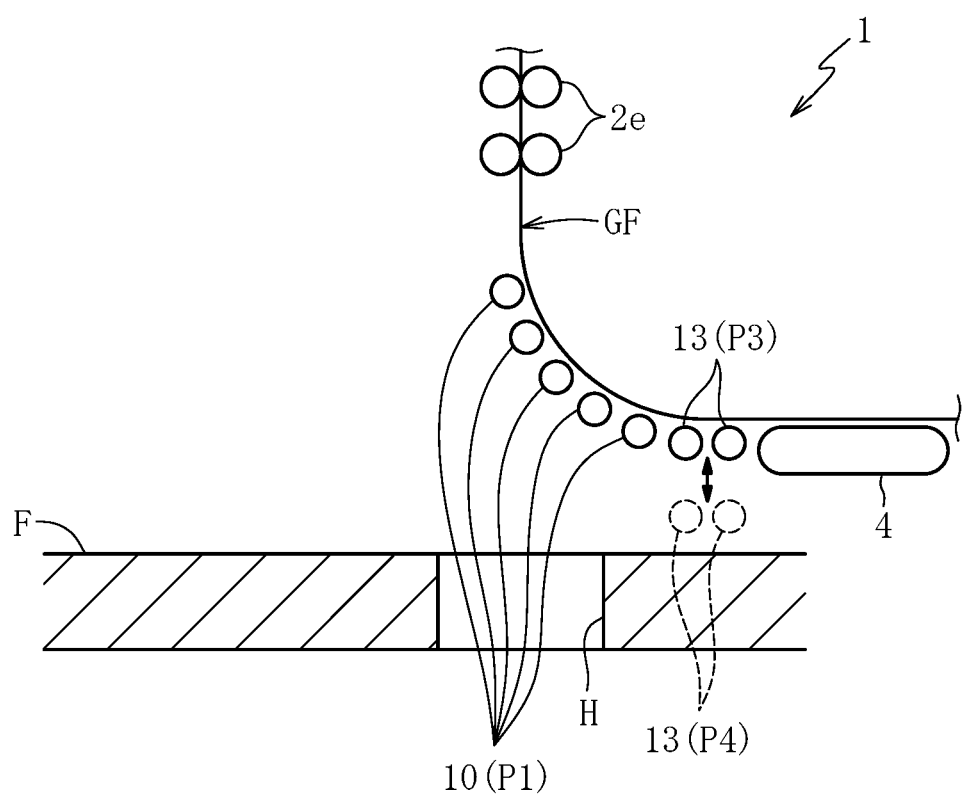
FIG. 7 is a schematic side view for illustrating a manufacturing apparatus for a band-shaped glass film according to a modification example of the present invention.

The present invention is not limited to the embodiment described above, and various modifications can be made within the technical idea of the present invention. For example, in the embodiment described above, the plurality of rollers 10 being at the regular position P1 and the first horizontal-conveyance unit 4 are adjacent to each other. However, as illustrated in FIG. 7, support members (auxiliary rollers 13) configured to support the band-shaped glass film GF from the lower side may be arranged between the plurality of rollers 10 being at the regular position P1 and the first horizontal-conveyance unit 4. The auxiliary rollers 13 are movable in the up-and-down direction between a support position P3 for supporting the band-shaped glass film GF and a waiting position P4 below the support position P3. In FIG. 7, illustration of the casing 11 and the scratching unit 12 is omitted for clear illustration of the auxiliary rollers 13.

In this case, when the band-shaped glass film GF on upstream of the cut part cannot be fully supported by the rollers 10 of the direction-changing unit 3, the band-shaped glass film GF can be received by the auxiliary rollers 13 at the waiting position P4. Then, when the auxiliary rollers 13 having received the band-shaped glass film GF move from the waiting position P4 to the support position P3, the band-shaped glass film GF can advance onto the first horizontal-conveyance unit 4. That is, the band-shaped glass film GF can more reliably be introduced to the first horizontal-conveyance unit 4.

The auxiliary rollers 13 may be non-drive rollers (guide rollers), or may be drive rollers. Moreover, it is not always required that the support members configured to support the band-shaped glass film GF from the lower side be the rollers. The support member may be, for example, a belt conveyor or an air-float table.

Moreover, in the embodiment described above, in order to cut the band-shaped glass film GF, the rollers 10 of the direction-changing unit 3 are directly brought into abutment against the band-shaped glass film GF to apply the pressing force. However, the present invention is not limited to this configuration. For example, the pressing force may be applied by jetting gas toward the band-shaped glass film GF through use of a gas jetting mechanism provided to the direction-changing unit 3.

Moreover, in the embodiment described above, the band-shaped glass film GF is cut by bend-breaking after scratching the band-shaped glass film GF. However, the band-shaped glass film GF may be cut by bend-breaking without scratching the band-shaped glass film GF. Moreover, when the band-shaped glass film GF is to be scratched, the band-shaped glass film GF may be manually scratched through use of, for example, a diamond cutter without providing the scratching units 12 to the manufacturing apparatus 1.

Moreover, in the embodiment described above, the scratching units 12 are assembled to the casing 11. However, the scratching units 12 may be arranged at another part in the manufacturing apparatus 1 (for example, part at which the band-shaped glass film GF falls in FIG. 1).

Moreover, in the embodiment described above, the retreated position P2 of the rollers 10 of the direction-changing unit 3 is located at a position at which the rollers 10 do not interfere with the band-shaped glass film GF. However, the retreated position P2 may be at a position at which the rollers 10 somewhat interfere with the band-shaped glass film GF.

Moreover, in the embodiment described above, the band-shaped glass film GF is cut by bend-breaking at the time of starting forming of the band-shaped glass film GF. However, the timing of cutting the band-shaped glass film GF by bend-breaking is not limited to such timing. For example, the band-shaped glass film GF may be cut by bend-breaking after the band-shaped glass film GF is temporarily caused to fall through the through hole H of the floor F for maintenance of the first horizontal-conveyance unit 4 or any other equipment provided downstream of the first horizontal-conveyance unit 4. Moreover, the band-shaped glass film GF may be cut by bend-breaking after the band-shaped glass film GF has been manufactured by cutting below the floor F (lower-level floor).

Moreover, in the embodiment described above, the band-shaped glass film GF falls from the forming unit 2. However, the band-shaped glass film GF may fall in the course of conveyance.

REFERENCE SIGNS LIST

1 manufacturing apparatus
4 first horizontal-conveyance unit
10 roller (direction-changing member)
11 casing
12 scratching unit
13 auxiliary roller
GF band-shaped glass film
GFa edge portion (each end portion in width direction)
P1 regular position
P2 retreated position
P3 support position
P4 waiting position

The invention claimed is:

1. A manufacturing method for a band-shaped glass film, comprising use of:
   a direction-changing member configured to change a direction of a falling band-shaped glass film to a horizontal direction; and
   a horizontal-conveyance unit configured to convey the band-shaped glass film in the horizontal direction after the changing of the direction of the band-shaped glass film,
   wherein the direction-changing member is movable in the horizontal direction between a regular position for changing the band-shaped glass film in direction and a retreated position which is separated from the horizontal-conveyance unit farther than the regular position,
   wherein, after a lower end of the band-shaped glass film passes through a position between the direction-changing member being at the retreated position and the horizontal-conveyance unit, the direction-changing member is moved from the retreated position toward the regular position to apply a pressing force to the band-shaped glass film, to thereby cut the band-shaped glass film along a width direction by bend-breaking,
   wherein the direction-changing member comprises a plurality of rollers and a scratching unit which are assembled to a casing,
   wherein the direction-changing member is movable between the regular position and the retreated position by movement of the casing,
   wherein the scratching unit is configured to scratch the band-shaped glass film for the bend-breaking, and
   wherein a speed of the direction-changing member given at a time of moving from the retreated position to the regular position is higher after the scratching unit scratches the band-shaped glass film than before the scratching unit scratches the band-shaped glass film.

2. The manufacturing method for a band-shaped glass film according to claim 1, wherein the scratching unit is configured to scratch both end portions of the band-shaped glass film in the width direction.

3. The manufacturing method for a band-shaped glass film according to claim 1, further comprising a support member, which is provided between the direction-changing member being at the regular position and the horizontal-conveyance unit, and is configured to support the band-shaped glass film from a lower side,
   wherein the support member is movable in an up-and-down direction between a support position for supporting the band-shaped glass film and a waiting position below the support position.

4. A manufacturing apparatus for a band-shaped glass film, the manufacturing apparatus comprising:
   a direction-changing member configured to change a direction of a falling band-shaped glass film to a horizontal direction; and
   a horizontal-conveyance unit configured to convey the band-shaped glass film in the horizontal direction after the changing of the direction of the band-shaped glass film,
   wherein the direction-changing member is movable in the horizontal direction between a regular position for changing the band-shaped glass film in direction and a retreated position which is separated from the horizontal-conveyance unit farther than the regular position, and wherein, after a lower end of the band-shaped glass film passes through a position between the direction-changing member being at the retreated position and the horizontal-conveyance unit, the direction-changing member is moved from the retreated position toward the regular position to apply a pressing force to the band-shaped glass film, to thereby cut the band-shaped glass film along a width direction by bend-breaking, wherein the direction-changing member comprises a plurality of rollers and a scratching unit which are assembled to a casing, wherein the direction-changing member is movable between the regular position and the retreated position by movement of the casing, wherein the scratching unit is configured to scratch the band-shaped glass film for the bend-breaking, and wherein a speed of the direction-changing member given at a time of moving from the retreated position to the regular position is higher after the scratching unit scratches the band-shaped glass film than before the scratching unit scratches the band-shaped glass film.

* * * * *